United States Patent
Chin et al.

(10) Patent No.: US 9,690,959 B2
(45) Date of Patent: Jun. 27, 2017

(54) RFID-TO-BLUETOOTH SELECTIVE ADAPTER WITH MULTIPLE RFID INTEGRATED CHIPS

(71) Applicant: POLARIS TECH GLOBAL LIMITED, Victoria (SC)

(72) Inventors: Ting-Yueh Chin, Taichung (TW); Su-Teng Kuo, New Taipei (TW)

(73) Assignee: POLARIS TECH GLOBAL LIMITED, Apia (WS)

( * ) Notice: Subject to any disclaimer, the term of this patent is extended or adjusted under 35 U.S.C. 154(b) by 207 days.

(21) Appl. No.: 14/726,581

(22) Filed: May 31, 2015

(65) Prior Publication Data

US 2016/0239694 A1  Aug. 18, 2016

Related U.S. Application Data

(63) Continuation-in-part of application No. 14/623,464, filed on Feb. 16, 2015, now Pat. No. 9,087,246.

(51) Int. Cl.

| G05B 19/00 | (2006.01) |
|---|---|
| G06K 7/10 | (2006.01) |
| H04W 4/00 | (2009.01) |
| G06K 19/07 | (2006.01) |
| G07C 9/00 | (2006.01) |
| B66B 1/46 | (2006.01) |

(52) U.S. Cl.
CPC .......... *G06K 7/10297* (2013.01); *B66B 1/468* (2013.01); *G06K 19/0723* (2013.01); *G07C 9/00* (2013.01); *H04W 4/008* (2013.01); *B66B 2201/4653* (2013.01); *B66B 2201/4676* (2013.01)

(58) Field of Classification Search
CPC .............. G06K 7/10366; G06K 7/0008; G06K 7/10009; G06K 9/07749; G06K 7/10297; G06K 7/1038

USPC ............ 340/10.1, 10.34, 10.5, 572.1, 572.4; 455/41.1, 41.2

See application file for complete search history.

(56) References Cited

U.S. PATENT DOCUMENTS

| 8,880,055 B1 * | 11/2014 | Clement | ............ G06Q 20/3278 455/410 |
|---|---|---|---|
| 2007/0202807 A1 * | 8/2007 | Kim | ...................... H04B 5/0062 455/41.2 |
| 2012/0007712 A1 * | 1/2012 | Tung | ...................... B60R 25/243 340/5.72 |

* cited by examiner

*Primary Examiner* — Kerri McNally
*Assistant Examiner* — Sharmin Akhter
(74) *Attorney, Agent, or Firm* — Ding Yu Tan

(57) ABSTRACT

RFID-to-Bluetooth selective adapter with multiple RFID integrated chips mounted on RFID elevator controller, having customized RFID transponders, a bluetooth module, and an extended I/O connector is disclosed. Customized RFID transponders include RFID Integrated chips, RFID sensor coils, and a SPNT switch. Extended I/O connector is configured to allow connection of customized RFID transponders by coupling to SPNT switches. Bluetooth module instructs which one of SPNT switches is to be opened or closed, which then connects one RFID sensor coil with one corresponding RFID Integrated chip, while other RFID sensor coils and remaining RFID Integrated chips are disconnected. Selection criteria of chosen RFID IC by Bluetooth module is in accordance with preconfigured allocated access right given to each user by an administrator and is programmed on flash memory, EEprom memory of Bluetooth module, in APP, or on cloud authentication server. More than one customized RFID transponder can be chained together.

12 Claims, 3 Drawing Sheets

RFID-TO-BLUETOOTH SELECTIVE ADAPTER WITH MULTIPLE RFID INTEGRATED CHIPS

CROSS-REFERENCE TO RELATED APPLICATIONS

This application is a continuation-in-part application of prior application Ser. No. 14/623464, filed on Feb. 16, 2015, now pending, the patent application identified above is incorporated here by reference in its entirety to provide continuity of disclosure.

FIELD OF THE INVENTION

The present invention generally relates to a method for RFID elevator controllers using a RFID-to-Bluetooth adapter device with multiple RFID integrated chips and, more particularly, to an authentication and operating method of a RFID elevator controller using a smartphone or wearable device together with a RFID-to-Bluetooth selective adapter with multiple RFID integrated chips mounted on the RFID elevator controller of an elevator.

BACKGROUND OF THE INVENTION

Elevators in high-rise buildings have becoming more sophisticated and efficient in design, especially in the control system thereof. Many commercial RFD elevator controllers have been implemented in elevators of high-rise buildings, The RED elevator controllers are designed to fit into elevator panels and can operate in mode off-line or online modes. Due to the higher demand of guest security in the hospitality industry, more and more hospitality accommodation establishments, such as hotels, motels, bed and breakfast, resort condos, and Airbnb® lodgings have adopted RFID elevator controllers in their elevator systems to allow only registered and authorized guests or staff with a valid keycard to gain access to the elevator. A RFID reader is disposed inside the RFID elevator controller, similar to that of a RFID door lock. Main advantage of conventional REID elevator controller used together with RFID keycards is that it is possible to limit access to floors according to each guest or staff RFID keycard's privileges. Several relay modules or relay boards can be combined together as a single relay module cluster so as to provide a large number of relay outputs to selectively enable the elevator call buttons for flexibly enabling coverage to large number of floor levels. For example, if a relay board handles 8 relay outputs, then 4 combined relay boards can handle a total of 32 relay outputs, which is then configured for handling 32 floor building.

Although the existing conventional RFID elevator controller used together in combination with the RFID keycards seem like a secure elevator control technology. However, such configuration is not very user friendly because the RFID keycard has to be physically retrieved or obtained from another person at the start of the usage period, and then to physically return the RFID keycard at the end of the usage period. The RFID keycard can sometimes get damaged or become defective during usage. It is also a hassle to carry the RFID keycard around for the user. Meanwhile, the RFID keycard can also be stolen or misplaced. Therefore, there is a need for improvement in the related industry for a better elevator controller system.

SUMMARY OF THE INVENTION

The present invention provides a RFID-to-Bluetooth selective adapter with multiple RFID integrated chips (RFID-to-Bluetooth MRIC selective adapter) which can be mounted on a RFID elevator controller of an elevator.

The present invention provides a configuration method of a RFID elevator controller using a smartphone or wearable device together with a RFID-to-Bluetooth MRIC selective adapter mounted on a RFID elevator controller of an elevator, a post box or a storage locker with RFID lock.

The present invention provides an operating method of a RFID elevator controller using a smartphone or wearable device together with a RFID-to-Bluetooth MRIC selective adapter mounted on a RFID elevator controller of an elevator, a post box or a storage locker with RFID lock.

In an embodiment of present invention, the RFID-to-Bluetooth MRIC selective adapter includes a customized RFID transponder, a Bluetooth module, and an extended I/O connector.

The present invention provides that more than one customized RFID transponder can be chained together by using the extended I/O connector so that the total number of allocated RFID ICs can be expanded.

In embodiments of present invention, the RFID-to-Bluetooth MRIC selective adapter includes a customized RFID transponder, a Bluetooth module, and an extended I/O connector.

In embodiments of present invention, the customized RFID transponder includes a plurality of RFID Integrated chips (IC), a plurality of RFID sensor coils, and a single-pole-multiple-throw (SPNT) switch.

In an embodiment, a total of 10 RFID Integrated chips(IC) 100 are included.

The present invention provides the SPNT switch to be single-ended output or differential output.

The present invention provides some conventional impedance-matching circuits to achieve input impedance matching of the RFID ICs and the RFIC sensor/antenna coils so as to overcome large amount of parasitic capacitance and impedance mismatch.

The present applications have a plurality of RFID chips, in which the RFID chips are described in the parent application (U.S. Ser. No. 14/623464) filed on Feb. 16, 2015 as being RFID chip (1210).

In the embodiments of present invention, authenticated user can be allowed access to specified functions of a device, in which the device is configured with an RFID reader of which a RFID-to-Bluetooth selective adapter with multiple RFID integrated chips is mounted thereon; however, certain functions of the device requiring different or higher access levels would then deny access to unauthorized users.

Several advantages of the embodiments of the present invention include the following: (1) the smartphone configured with the APP along with the authentication digital certificate offer superior overall security than the RFD keycard due to improved functionality such as being able to limit usage to specified individuals through two-factor authentication, and capable of offering of temporary authorization for just a specified time period only. (2) the smartphone configured with the APP along with the authentication digital certificate offer superior overall security than the RFID keycard due to improved scalability, such as, based on particular usage scenario, one authorized user can pass along the authorization to another person effortlessly and instantly, or the same authorization can be duplicated to a group of people instantly. For example, a travel sightseeing touristry group of 45 tourists staying in different rooms on the same floor level can gain instant elevator floor level access through the tourguide sending out the duplicate authorizations to all 45 tourists. Thus, the multiple numbers of RFID chips can be configured and adapted for flexible and scalable rollout of multiple authentication or authorization levels or specified access rights restrictions. (3) the RFID-to-Bluetooth selective adapter with multiple RFID integrated chips offer cost savings due to the fact lesser number of physical RFID keycards need to be kept in possession. (4) the RFID-to-Bluetooth selective adapter with multiple RFID integrated chips offer tremendous convenience to the guest, because a registered VIP guest through online check-in, can walk directly to their designated room when using the RFID-to-Bluetooth selective adapter with multiple RFID integrated chips along with the smartphone configured with the APP for negotiating the security checkpoints of the elevator system and the room door access system configured with the RFID-to-Bluetooth Selective Adapter. This means that the VIP guest does not have to check-in at all at the front desk. (5) since no physical RFID keycard is used when using smartphone configured with the APP for gaining authentication by elevator controller that has the RFID-to-Bluetooth selective adapter with multiple RFID integrated chips attached thereon, nothing can be lost or stolen.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of the embodiments of this invention are presented herein for purpose of illustration and description only. It is not intended to be exhaustive or to be limited to the precise form disclosed.

The present invention is intended to improve upon the RFID-to-Bluetooth selective adapter as described in the parent application (U.S. application Ser. No. 14/623464) filed on Feb. 16, 2015 which has the RFID-to-Bluetooth selective adapter adhered and mounted onto a sensor region of a conventional RFID reader, and the user being able to launch and activate the RFID transponder inside the RFID-to-Bluetooth selective adapter using a smartphone via Bluetooth communication. In the abovementioned patent application, one RFID-to-Bluetooth selective adapter is configured to perform in tandem with just one RFID transponder, thus where different authorization levels are required for different RFID IC chips, such one RFID transponder configuration thereof would not be able to fulfill such functional requirement accordingly. To illustrate the above, a usage example is provided as follow: for example, a tenant has rented a room at a room number 101 on the $10^{th}$ floor of a hotel, and the tenant arrives at the lobby front desk for check in. The front desk staff member gives a RFID keycard/room card to the tenant, which can not only open the room door to the room number 101, but also permits usage to the elevator to the tenant, but due to safety concerns, the RFID keycard/room card would only be granted elevator access permission to the specified floor, which is namely the $10^{th}$ floor only, so that access to other floors are denied to the tenant. The parent application (U.S. application Ser. No. 14/623464) alongside the instant disclosure herein together offer a viable solution to allow smartphones and wearable devices through Bluetooth to be used as viable authentication and access control solution (in lieu of traditional RFID keycard/room card) by elevators, which are configured with RFID readers with RFID-to-Bluetooth multiple RFID chips selective adapter mounted thereon.

Figure 1:
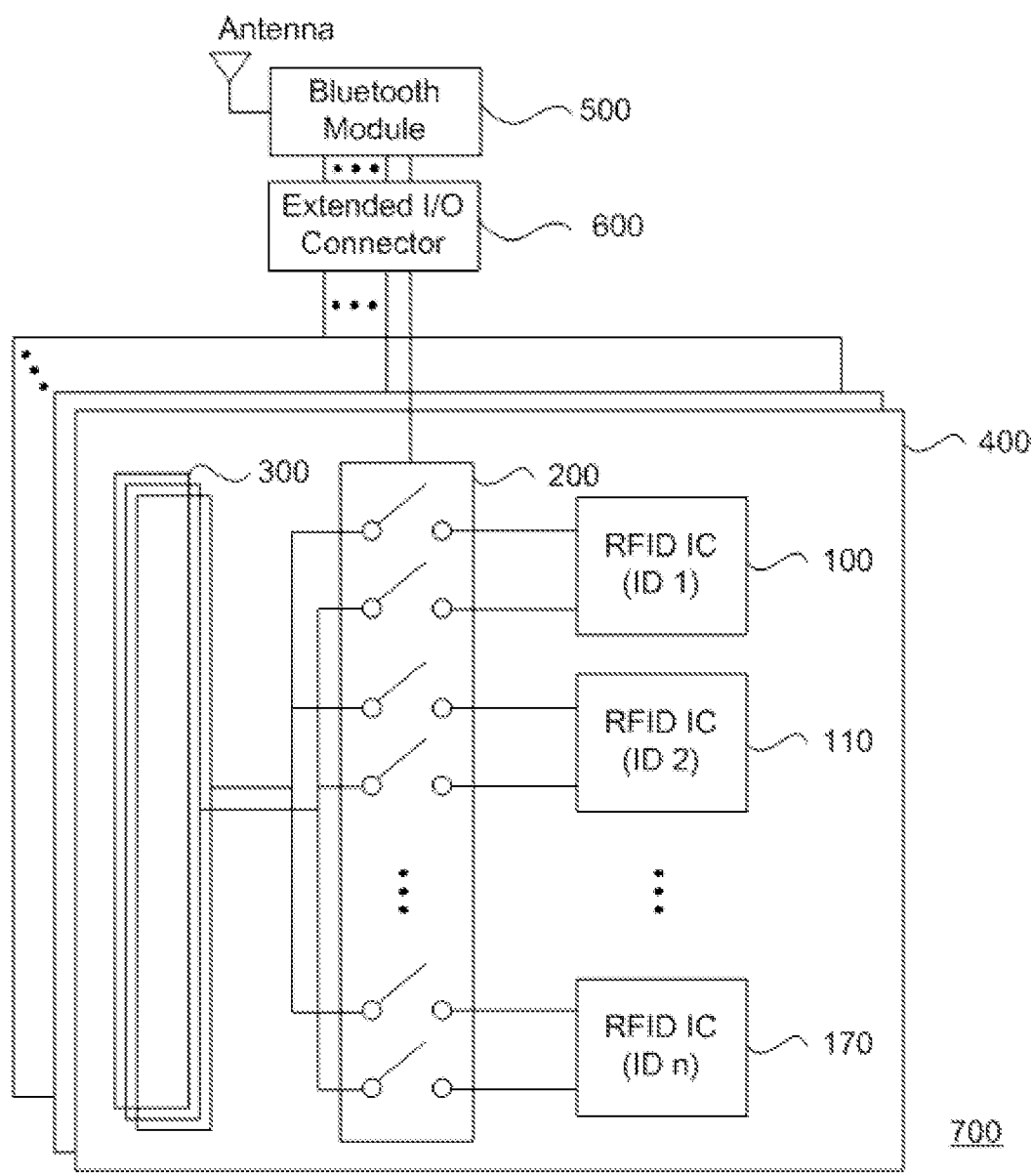
FIG. 1 shows an illustrative circuit block diagram of a RFID-to-Bluetooth selective adapter with multiple RFID integrated chips according to an embodiment of present invention.

Referring to an embodiment showing an illustrative circuit block diagram of a RFID-to-Bluetooth selective adapter with multiple RFID integrated chips (RFID-to-Bluetooth MRIC selective adapter) 700 is shown in FIG. 1. The RFID-to-Bluetooth selective adapter with multiple RFID integrated chips or the RFID-to-Bluetooth MRIC selective adapter 700 includes a customized RFID transponder 400, a Bluetooth module 500, an extended I/O connector 600. The extended I/O connector 600 is configured to allow the connection of multiple number of customized RFID transponders 400. The customized RFID transponder 400 includes a plurality of RFID Integrated chips (IC) 100, 110, 120, 130, 140, 150, 160, 170, a plurality of RFID sensor (antenna) coils 300, and a single-pole-multiple-throw (SPNT) switch 200. There are a total of N RFID Integrated chips(IC) 100, in which N can be 8. In one embodiment, there are 8 RFID IC chips. The Bluetooth module 500 through the usage of the single-pole-multiple-throw (SPNT) switch 200, can determine which one of the RFID sensor coils 300 is to be connected to the corresponding matching RFID IC (on a one-to-one basis). The SPNT switch 200 can be single-ended output or differential output. The RFID sensor/antenna coil 300 terminal has multiple switches (in the form of the SPNT switch 200), due to having to connect to multiple RFID ICs 100, 110, 120, 130, 140, 150, 160, 170, thereby causing large amount of parasitic capacitance, and producing a load that is causing impedance mismatch to that of the RFID sensor/antenna coil 300 (antenna), so that it is necessary to add some conventional Impedance-matching circuits to achieve input impedance matching of the RFID ICs (100 . . . 170) and the RFIC sensor/antenna coils 300. The Bluetooth module 500 can select between one of the multiple RFID ICs to be the chosen RFID transponder, in accordance with a preconfigured allocated access or permission rights given to each user by the administrator. Selection rule of the preconfigured access or permission rights for each user can be programmed on the flash memory, the EEprom memory of the Bluetooth module, recorded in the APP, or the cloud authentication server, but is not limited to these. The customized RFID transponder 400 can have 10 RFID ICs, but more than one customized RFID transponder 400 can be used together (in a chained manner), so that the total number of allocated RFID ICs can be expanded to a total of 20, 30, 40, 50, etc depending on the number of the customized RFID transponders 400 (that re chained together). As a result, the equivalent number of allocating RFID ICs can be equal to M×N., where M is the number of customized RFID transponders 400 chained together. Similar as described for the RFID-to-bluetooth selective adapter as taught in the parent application (U.S. Ser. No. 14/623464)

filed on Feb. 16, 2015, the customized RFID transponder of the RFID-to-bluetooth MRIC selective adapter when without being triggered into activation, would not interfere with other RFID tags/transponder that are also used in tandem with a RFID reader equipped device such as a RFID elevator controller, a post box or a storage locker with RFID lock. During actual usage, most of the RFID sensor coils 300 are in open circuit with respect to the RFID IC chips, respectively, which means that the RFID sensor coils without any load (at no load) would not negatively affect the communication between conventional RFID keycards and the RFID reader. Through the installation/mounting of the RFID-to-bluetooth MRIC selective adapter onto the RFID reader, users can conveniently use his smartphone or wearable device to gain authorization access of the RFID reader, so that the user is given a specified authorization and usage privilege.

Figure 2:
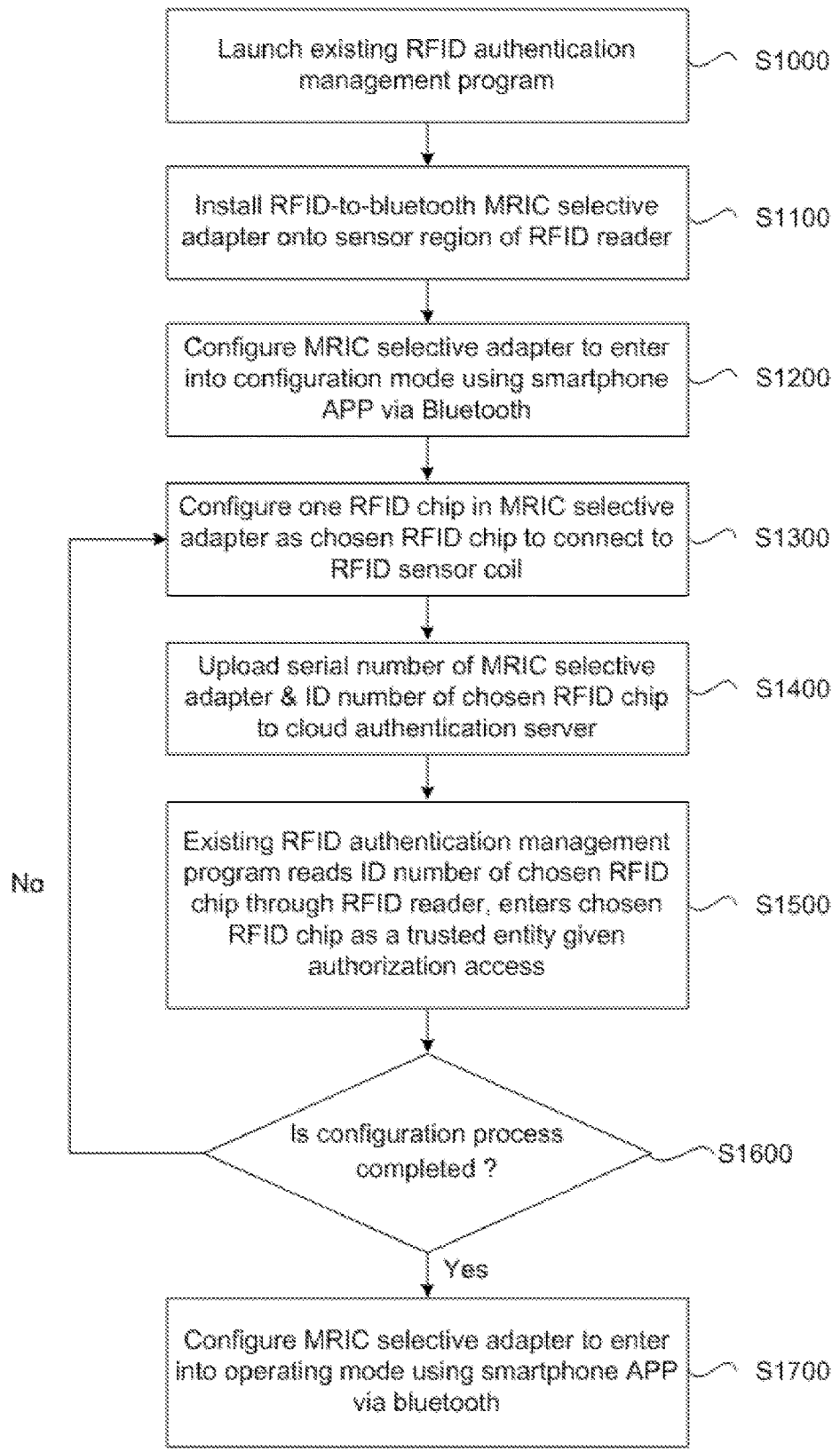
FIG. 2 shows a flow chart diagram of a configuration method of the RFID-to-bluetooth MRIC selective adapter with respect to the RFID reader according to the embodiment of present invention.

Referring to FIG. 2, a configuration method of the RFID-to-bluetooth MRIC selective adapter of the embodiment of FIG. 1 with respect to the RFID reader is shown, which is described in the following steps:

In Step S1000, an existing RFID authentication management program is launched. In Step S1100, the RFID-to-bluetooth MRIC selective adapter is installed onto the sensor region of the RFID reader. In Step S1200, an administrator uses a smartphone APP via Bluetooth to configure the RFID-to-bluetooth MRIC selective adapter to enter into a configuration mode. In Step S1300, the administrator uses the smartphone APP via Bluetooth to configure one of the RFID chips in the RFID-to-bluetooth MRIC selective adapter (as the chosen RFID chip) to be connect to a RFID sensor/antenna coil. In Step S1400, the (chosen) RFID chip receives an identification number, and a serial number of the RFID-to-bluetooth MRIC selective adapter along with the identification number of the chosen one RFID chip are sent or uploaded to a cloud authentication server. In Step S1500, existing RFID authentication management program reads the identification number of the chosen RFID chip through the RFID reader, and then enters the chosen RFID chip as a trusted entity to be given an appropriate authorization access right level and access restriction. In Step S1600, determine if the configuration process is completed, and if the answer is yes, go to Step S1700 and if the answer is no, go to Step S1300. In Step S1700, the administrator uses the smartphone APP via Bluetooth to configure the RFID-to-bluetooth MRIC selective adapter to enter into an operating mode thereof, as shown in FIG. 3.

Figure 3:
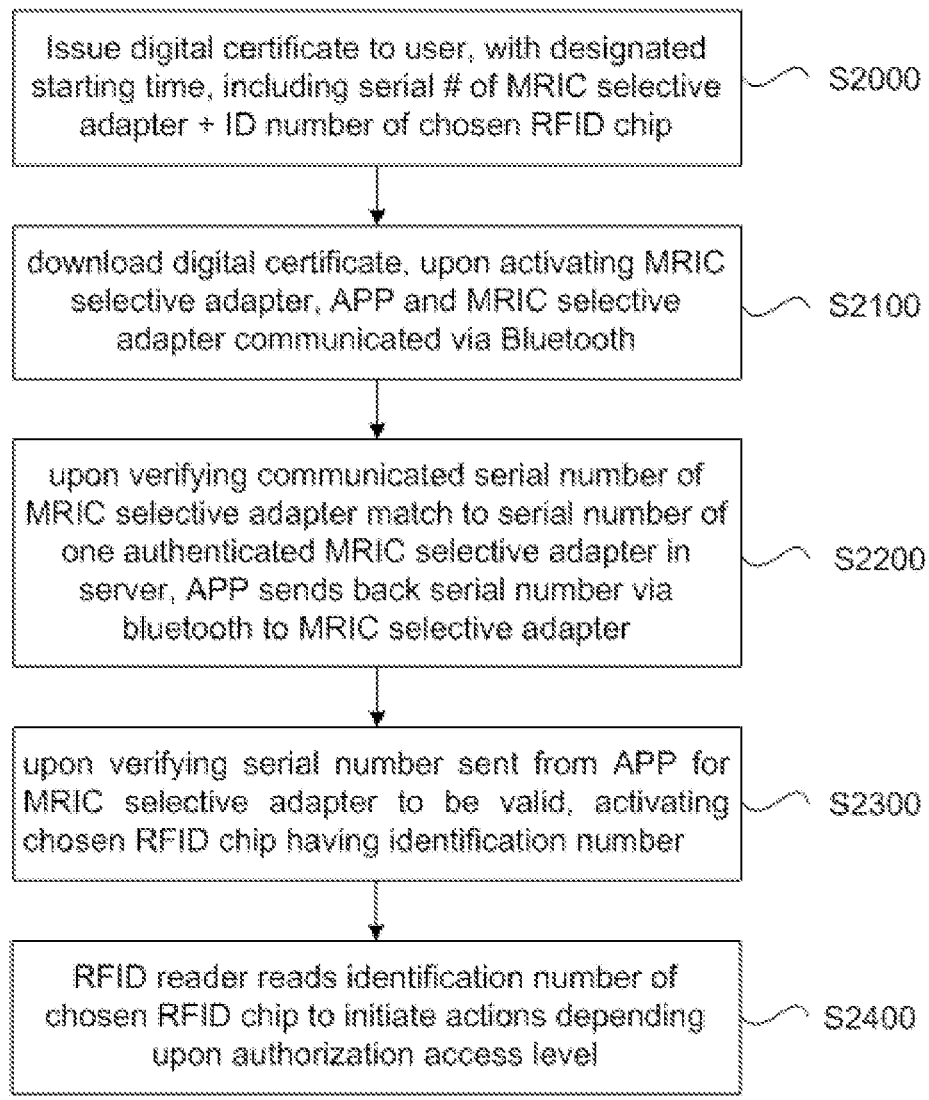
FIG. 3 shows a flow chart diagram of an operating method of the RFID-to-bluetooth MRIC selective adapter with respect to the RFID reader according to the embodiment of present invention.

Referring to FIG. 3, an operation method of the RFID-to-bluetooth MRIC selective adapter (of FIG. 1) with respect to the RFID reader is shown, and includes following steps: In Step S2000, the administrator via the cloud authentication server, issues a digital certificate to the user, and the digital certificate is a timed digital certificate with a designated starting time of a validity period, which includes the corresponding serial number of the RFID-to-bluetooth MRIC selective adapter along with the identification number of the chosen one RFID chip. In Step S2100, the user through the APP downloads the digital certificate, upon the user activates the RFID-to-bluetooth MRIC selective adapter, the APP and the RFID-to-bluetooth MRIC selective adapter then are communicated via Bluetooth. In Step S2200, upon verifying that the communicated serial number of the RFID-to-bluetooth MRIC selective adapter is a match to a serial number of one of the authenticated (and trusted) RFID-to-bluetooth MRIC selective adapters in the cloud authentication server, the APP sends back the serial number via bluetooth to the RFID-to-bluetooth MRIC selective adapter for allowing further actions. In Step S2300, upon verifying the serial number sent from the APP for the RFID-to-bluetooth MRIC selective adapter to be valid, activating the (chosen) RFID chip having the identification number. In Step S2400, the RFID reader reads the identification number of the (chosen) RFID chip so as to initiate actions depending upon authorization access right level and access restrictions thereof.

In the embodiment of present invention, the RFID-to-Bluetooth Selective Adapter with Multiple RFID Integrated Chips 700 can be matched with a control signal, so as to directly authorize a RFID reader equipped device to perform actions. The RFID reader equipped device can be an elevator. For example, an authorized elevator rider can be automatically carried to a desired (specified) floor level without any manual elevator call button pressing by the elevator rider due to automatic communication of such access rights restriction settings. Another example would be when a friend lives on a different floor level, one can use the APP to send a temporary access right invitation so that authorized tenant of a different floor level can go to the friend's floor level. In addition, another usage scenario can be when the tenant through the smartphone APP is to reserve service on a particular floor level of the hotel, and upon completion of payment conducted online, shall immediately received a temporary authorization certificate, so that the tenant can use the smartphone to proceed to be taken to the floor level of the friend to access certain services, and upon completion of the services, the temporary authorization certificate would then automatically expires so that the tenant cannot later access the same service on that floor level without further permission.

The RFID-to-bluetooth MRIC selective adapter of present invention can operate under a Bluetooth protocol version called Bluetooth Low Energy (BLE), which is a wireless personal area network technology configured for establishing device-to-device communications that can operating under very low power consumption. Meanwhile, the Bluetooth special interest group (SIG) refers to BLE as Bluetooth Smart. In the above embodiment, the compatible Bluetooth versions that can be used include Bluetooth, Bluetooth smart, Bluetooth smart ready, and/or other Bluetooth versions also included.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A RFID-to-Bluetooth selective adapter with multiple RFID integrated chips, to be mounted on a RFID reader equipped electronic device, comprising:
   a plurality of customized RFID transponders;
   a bluetooth module; and
   an extended I/O connector;
   wherein the customized RFID transponders include a plurality of RFID Integrated chips (IC), a plurality of RFID sensor coils, and a single-pole-multiple-throw (SPNT) switch, the extended I/O connector is configured to allow the connection of the customized RFID transponders by directly coupling to the SPNT switches of the customized RFID transponders, respectively;

wherein the Bluetooth module instructs as to which one of the SPNT switches is to be opened or closed, the SPNT switch of the customized RFID transponder then connects one RFID sensor coil and one corresponding RFID Integrated chip (IC), while all other remaining RFID sensor coils and corresponding remaining RFID Integrated chips are disconnected.

2. The RFID-to-Bluetooth selective adapter with multiple RFID integrated chips of claim 1, wherein there are eight RFID Integrated chips (IC) therein.

3. The RFID-to-Bluetooth selective adapter with multiple RFID integrated chips of claim 1, wherein more than one customized RFID transponder are chained together.

4. The RFID-to-Bluetooth selective adapter with multiple RFID integrated chips of claim 1, wherein the customized RFID transponder when without being triggered into activation, would not interfere with other RFID transponders that are also used with the RFID reader equipped electronic device.

5. The RFID-to-Bluetooth selective adapter with multiple RFID integrated chips of claim 1, wherein the SPNT switch has single-ended output or differential output.

6. The RFID-to-Bluetooth selective adapter with multiple RFID integrated chips of claim 1, wherein the RFID reader equipped electronic device is a RFID elevator controller used in an elevator, a plurality of post boxes configured with RFID locks, or a plurality of storage lockers configured with RFID locks.

7. A RFID-to-Bluetooth selective adapter with multiple RFID integrated chips, to be mounted on a RFID reader equipped electronic device, comprising:
  a plurality of customized RFID transponders;
  a bluetooth module; and
  an extended I/O connector;
  wherein the customized RFID transponders include a plurality of RFID Integrated chips (IC), a plurality of RFID sensor coils, and a single-pole-multiple-throw (SPNT) switch, the extended I/O connector is configured to allow the connection of the customized RFID transponders by directly coupling to the SPNT switches of the customized RFID transponders, respectively;
  wherein a selection criteria of one RFID IC from the RFID ICs by the Bluetooth module is in accordance with a preconfigured allocated access right given to each user by an administrator, the selection criteria is programmed on a flash memory, an EEprom memory of the Bluetooth module, in the APP, or on a cloud authentication server.

8. The RFID-to-Bluetooth selective adapter with multiple RFID integrated chips of claim 7, wherein there are eight RFID Integrated chips (IC) therein.

9. The RFID-to-Bluetooth selective adapter with multiple RFID integrated chips of claim 7, wherein more than one customized RFID transponder are chained together.

10. The RFID-to-Bluetooth selective adapter with multiple RFID integrated chips of claim 7, wherein the customized RFID transponder when without being triggered into activation, would not interfere with other RFID transponders that are also used with the RFID reader equipped electronic device.

11. The RFID-to-Bluetooth selective adapter with multiple RFID integrated chips of claim 7, wherein the SPNT switch has single-ended output or differential output.

12. The RFID-to-Bluetooth selective adapter with multiple RFID integrated chips of claim 7, wherein the RFID reader equipped electronic device is a RFID elevator controller used in an elevator, a plurality of post boxes configured with RFID locks, or a plurality of storage lockers configured with RFID locks.

* * * * *